Figure 1:
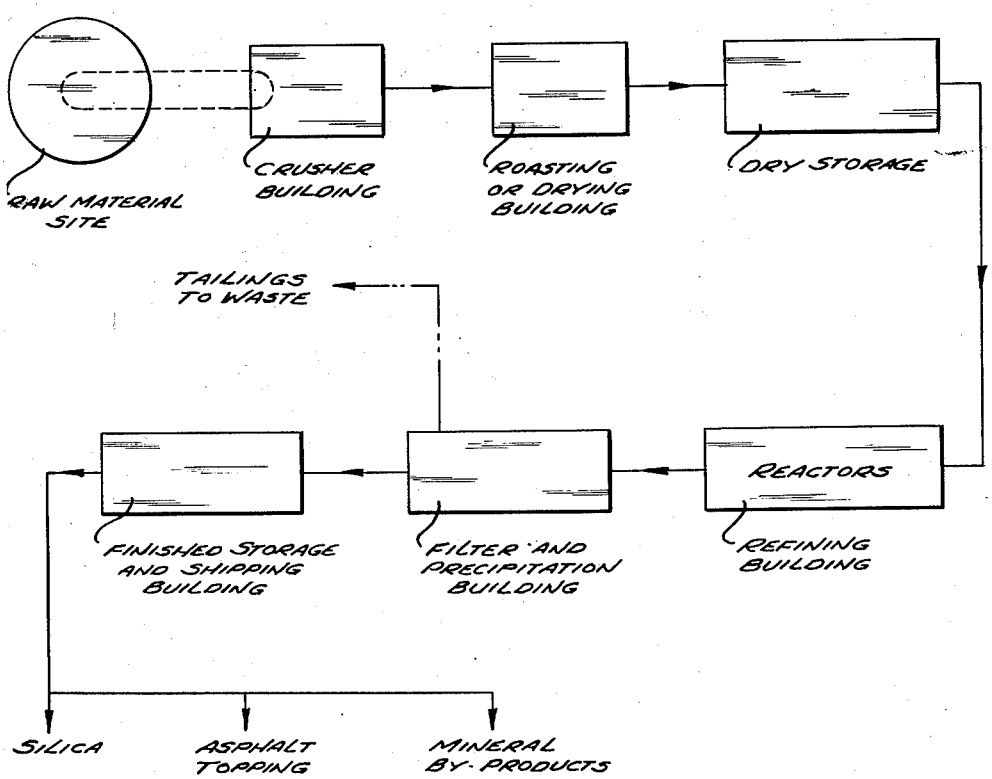

Aug. 13, 1963 L. W. HUNTINGTON 3,100,701
CONTINUOUS PROCESS MINERAL SEPARATION
Filed Aug. 11, 1960 2 Sheets-Sheet 1

INVENTOR.
LAURENCE W. HUNTINGTON
BY Ray S. Pyle
WATTS EDGERTON, PYLE & FISHER

ATTORNEYS

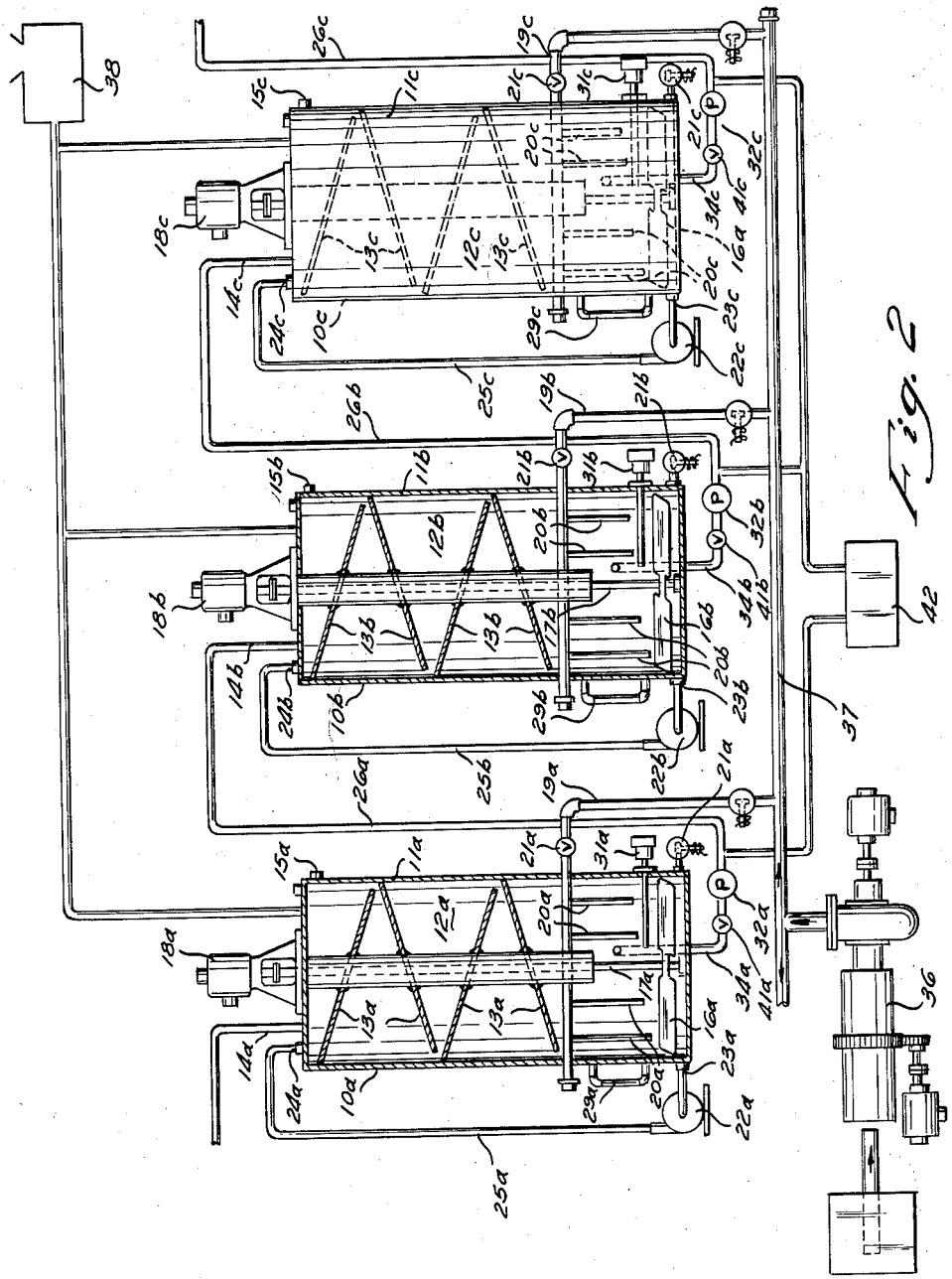

United States Patent Office 3,100,701
Patented Aug. 13, 1963

3,100,701
CONTINUOUS PROCESS MINERAL SEPARATION
Laurance W. Huntington, Groveport, Ohio, assignor to Reno Engineering & Mining Co., a corporation of Nevada
Filed Aug. 11, 1960, Ser. No. 48,872
3 Claims. (Cl. 75—101)

This invention relates to separating metal from metallic ore bearing material, and more particularly to a continuous process for separating acid soluble metals from metallic ore bearing material at a variable controlled pH.

Continuous processing, in this area, as in others, results in substantial cost reduction over batch process methods. Because of the very low cost of this process, it is economically feasible to separate acid soluble metals from metallic ore bearing material to obtain high grade gangue irrespective of the commercial value of the metals removed. If the concentration of the metal present is such that it can be economically recovered, then it becomes a commerical by-product; but, the concentration of the metal does not determine the commercial feasibility of the operation. Basically, and primarily, this process is to separate base material from metal contained as a metallic ore, whether the economic material recovered is primarily the gangue or the metal.

Therefore, one of the principal objects of this invention is to provide a substantially continuous process of separating metal from metallic ore bearing material.

A more particular object of this invention is to provide a process for separating metal from metallic ore bearing material wherein the material is substantially continuously introduced into the process.

A more specific object of this invention is to provide a process wherein metallic ore bearing material is substantially continuously fed into one reactor, to begin metallic separation at a controllable pH condition, and is thereafter periodically conducted to a second similar reactor for continuing the separation at controllable pH conditions.

Another principal object of this invention is to provide a series of reactors for successively separating metal from metallic ore bearing material, and controlling the pH in each reactor by introducing sulfur oxide gas at a selectable controlled rate into each reactor.

Another more particular object of this invention is to provide a series of reactors for successively separating metal from metallic ore bearing material at controlled selectable pH conditions with the pH in at least one reactor at slightly less than 7, and the pH in each reactor being controlled by introducing sulfur oxide gas at a controlled rate.

Other objects and a fuller understanding of the invention may be had by referring to the following description and claims taken in conjunction with the accompanying drawings in which:

FIGURE 1 is a flow sheet of the entire operation of handling, preparation and treatment of metallic ore bearing material; and FIGURE 2 is a somewhat schematic side elevational view of three reactors connected in series partially in section with parts broken away and removed.

Referring now to the drawings, and particularly FIGURE 1, the flow sheet of the entire operation is shown to introduce environmental background for this new and novel process of continuous metal separation.

Material containing metallic ore is mined and transported to a conventional crusher. Here the material is reduced to a preselected size. After crushing, the material is either roasted or dried, depending upon the type of material and metallic ore it contains; the standards for selection are well known in the art. After roasting or drying by a conventional operation, the material is conveyed to a dry storage area to await its introduction into the novel and improved separation process. It is in this process that this invention lies.

It is well known in the art that an acid soluble metal in certain ore forms can be separated from material containing that ore by maintaining the material in an acid solution. The time required to separate the metal depends upon various factors including the type of ore, grade of ore, pH of the acid solution, the acid used, the temperature, and other factors which are known in the art. When these factors have been determined and/or selected, a person skilled in the art can compute, or estimate with a high degree of accuracy, the time required to separate a predetermined amount of a given metal from the material at a given hydrogen ion concentration. With prior art methods, a given amount of metallic ore bearing material is placed in a vessel, an acid solution having enough hydrogen ions available to react with a preselected desired amount of metallic ore is introduced; and the reaction is allowed to continue until the desired percent of any given metal has been leached from the ore. Then, the mixture is filtered to separate the metal bearing solution and the gangue. As used herein leaching refers to a batch process and metal separation is used to refer to the continuous process.

The prior art methods necessitate the use of a strongly acid solution. This new and novel method of separation obviates the need of a highly acid solution throughout the process, as well as providing a substantially continuous process.

Referring now to FIGURE 2, in this new and novel process a series of reactors 10a, 10b, and 10c are provided, the structure of which will be described presently. FIGURE 2 shows three reactors, but it is understood that more can be connected in a similar manner. Separation is begun in one reactor and continued in one or more reactors until completed. The separation is carried out by forming a mixture of metallic ore bearing material and water, and bubbling sulfur oxide gas through the mixture. The rate of flow of the gas is controlled in each reactor to provide any desired pH condition in each reactor.

Thus, at different stages during the process, the separation may be accomplished under different pH conditions. Normally, most of the separation can be accomplished by controlling the rate of flow of the gas, such that virtually as rapidly as the gas forms an acid with the water, the acid reacts with the ore. This will produce virtually a neutral condition only slightly acidic with the pH very close to 7. However, there may be certain metal ores in the material which will not react, or react extremely slowly in a slightly acid solution, but will respond readily to a stronger acid solution. Or, for some other reason, the operator may desire a stronger acid solution. This can be accomplished by controlling the rate of flow of the sulfur oxide gas in each of the reactors to produce the desired pH condition, without the necessity of maintaining a strongly acid condition throughout the process.

In keeping the solution almost neutral, with the acid reacting virtually as rapidly as it is formed, corrosion and similar wear on the reactors is reduced to a minimum. Any separation by a highly acid solution can be carried out in but a few of the reactors rather than in a single "batch" reactor.

Further, much versatility is added to the process by providing optimum conditions for reaction for several different metals in a given material. This permits a much greater range of possible treatments in a single continuous process.

The operator, using the factors mentioned above, determines the pH condition to be used to separate each metal and calculates the total time that an acid formed by bubbling sulfur oxide gas through water at a controlled rate must act to separate the desired percentage of all the metals from a metallic ore bearing material. Based on this calculation, the number of reactors for optimum efficiency is selected by the operator. In all cases, at least two reactors will be required. Normally, more than two will be required. The total time required is then divided by the number of reactors selected, and the quotient represents the time that the material will be retained in each reactor. Let $T$ represent the total separation time and $t$ represent the time the material must remain in each reactor. (The time the material remains in each reactor must be the same, the reason for which will be more fully explained presently.)

The process is carried out as follows: The metallic ore bearing material is continuously fed into the first reactor with water, and sulfur oxide gas is bubbled through the mixture at a controlled rate to maintain the selected pH condition. After time $t$ has elapsed, the material in the first reactor is conveyed to the second reactor, and sulfur oxide gas is bubbled through the mixture at a controlled rate to maintain the selected pH condition. After the material has remained in the second reactor for time $t$, if two reactors are all that were selected then $2t$ equals $T$, and the separation has been completed and the material is removed from the second reactor. If more than two reactors were selected then the material is conveyed from the second to the third reactor, where it remains for a time $t$, etc., until the total time in all the reactors equals $T$.

The construction and operation of each reactor is as follows, wherein when necessary the different reactors and their like parts are designated by a letter designation after the number.

Each reactor 10 has a cylindrical tank 11 defining an internal chamber 12. A feed material entrance 14 is provided at the top of the tank 11. Several oppositely slanting, vertically staggered baffles 13 are carried by the tank 11, and are positioned in the chamber 12. Metallic ore bearing material is continuously introduced through the feed material entrance 14a into the first reactor 10a. The rate of feed of the material is adjusted such that a preselected amount will have been introduced into the first reactor 10a in time $t$. This amount is a function of the capacity of reactor 10a. The material is baffled in its downward descent through the chamber 12 and eventually drops to the bottom of the reactor.

Water is introduced into the first reactor 10a through a water entrance 15a and flows to the bottom of the reactor. Thus, a mixture of material and water collects at the bottom of the first reactor 10a.

Sulfur oxide gas is introduced into this mixture through gas pipes 20a projecting into this mixture. The gas pipes 20a project to different depths in the mixture to promote a more uniform distribution of the gas as it enters the mixture, and thus a more uniform pH throughout the mixture. The gas pipes 20a in turn are supplied by a gas conduit 19a. The sulfur oxide gas is supplied from a central producer 36 which is connected to the gas supply conduit 19 by a gas supply main 37.

A pH meter and valve assembly 21a is provided to regulate and control the flow of sulfur oxide gas. The pH meter and valve assembly 21a can be adjusted to allow a flow of gas to produce and maintain a preselected pH of the mixture. Normally the pH selected will be slightly less than 7, where possible as described above. The flow, as thus selected, will constantly be producing a rather small amount of hydrogen ions; and, virtually as rapidly as the hydrogen ions are being produced, they are reacting with the metallic ore. Thus, an almost neutral condition can be maintained, and still a reaction can be carried on. Effectively, a controlled limited amount of hydrogen ions are continuously being made available for the reaction.

However, the pH meter and valve assemblies 21 can control and vary the pH in each reactor independently, by regulating the rate of flow of the sulfur oxide gas into each reactor 10, the advantage of which has been indicated.

An in-process material outlet 23a is formed near the bottom of the tank 11a, and an in-process material inlet 24a is provided at the top of the tank 11a. The material is continuously recirculated in the reactor 10a by means of a circulating pump 22a drawing the material from the outlet 23a and pumping it through an in-process material conduit 25a into the inlet 24a.

The pumping action of the circulating pump 22a is augmented by an impeller agitator 16a disposed near the bottom of the chamber 12a; the impeller 16a is connected to a drive motor 18a by a drive shaft 17a, and is formed to induce a generally downward flow of the mixture, thus tending to force the mixture through the outlet 23a. The agitator also performs the function mixing to maintain a homogeneous mixture.

The in-process material also is baffled after it enters inlet 24a and descends to the bottom of the tank 11a. Since all of the sulfur oxide gas does not react to form acid, some escapes from the mixture and rises in the reactor. As it rises, it comes in contact with the descending material and further acts to form acid for metal separation as the material descends. From the reactor, the gases pass through a central exhaust gas scrubber 38 to the atmosphere.

A sight glass 29a is provided on the tank 11a to indicate the level of the mixture in the tank. Using the sight glass as a guide, minor adjustments of the rate of feed into the first reactor 10a can be made to insure that precisely the prescribed amount of material is being charged.

A heater 31a is provided. This allows the operator to select and control the temperature independently in each reactor.

After time $t$ has elapsed, the material that has been charged into the first reactor 10a is transferred to the second reactor 10b. A transfer pump 32a pumps the mixture from the first reactor 10a out of the transfer outlet 34a through a transfer conduit 26a to the second reactor 10b.

The mixture enters the second reactor 10b through the feed material inlet 23b. Normally, this mixture from the first reactor 10a constitutes the entire charge of the second reactor 10b. The metal separation is continued in the second reactor by the introduction of sulfur oxide gas in the same manner as in the first reactor. The rate of flow of the gas is controlled by the pH meter valve assembly 21b; again, the pH is normally maintained at less, slightly, than 7 if possible. Also, the mixture is agitated and recirculated in the same manner as in the first reactor.

When time $t$ has elapsed, the mixture is pumped out of the second reactor 10b. If the separation is not completed, the material is pumped from the second reactor 10b to the third reactor 10c and the separation continued similarly as in the second reactor 10b, and so on into additional reactors if necessary until the separation has been completed.

The transfer operation is controlled by a time sequence control mechanism 42 associated with solenoid operated gate valves 41 disposed in the transfer conduits 26. After the prescribed amount of time $t$ has elapsed, each of the gate valves 41a, 41b, and 41c is opened by the time sequence control 42, and the transfer pumps simultaneously transfer the material from each reactor to the next successive reactor and remove the material from the last reactor. Hence, the first reactor 10a is exhausted of the material collected during the time $t$. As the material is pumped from the second reactor 10b to the third reactor 10c, the material is being pumped from the first reactor 10a to the second reactor 10b, etc. The feed of the material continues in the first reactor 10a, and, after the next period of time $t$, the proper amount of material will have collected in the first reactor and the transfer operation is again performed. Thus, a continuous process ensues, with the material constantly being fed into the first reactor 10a, and the resultant product periodically being moved successively to each reactor and removed from the last reactor.

Each transfer conduit 26 has a ball check valve, not shown. Such valve will prevent any reverse flow of material.

When the separation has been completed, the mixture is transported to a conventional filter; and the solution containing the separated metal is filtered off the gangue. If the recovery of the metal in solution is economically feasible, it is precipitated out, filtered, and further conventionally processed. The separated gangue, remaining after the filtering, is roasted thus readying it for economic commercial sale. The resultant product is a gangue, free of deleterious metal and ready for sale.

The liquid remaining after the precipitated metal is filtered off is principally water with some acid. This can be used as the water introduced into the process, until the acidity reaches a predetermined amount, after which it is discarded.

This process has been found to be highly successful for separating metallic compounds from sodium salts of sea water, and to render the water salt-free and potable.

Raw sea water is introduced into the first reactor 10a, and reacted progressively through the series of chambers as above-described. After leaving the last of the reactors, the water is filtered to remove dirt and other undissolved debris and then treated with lime to convert the sulfur compounds of the various metals other than sodium into their insoluble oxide forms. The product is then filtered to remove the precipitated metallic oxides. The sodium chloride remains in solution free of contaminating metals. The water is then evaporated to leave substantially pure sodium chloride free of other contaminating metals and the evaporated water is condensed as a potable water suitable for irrigation and other water uses.

Therefore, this process is useful for separating sea water into saleable metallic oxides, sodium chloride free of contaminating metals, and useful water.

In summary, it is believed that the invention resides in providing a process into which metallic ore bearing material is continuously introduced into a first reactor where the rock is partially separated at a selected controlled pH condition, and thereafter conveyed to one or more similar reactors, one at a time, where the separation process is completed, at selectable controlled pH conditions.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention hereinafter claimed.

What is claimed is:

1. In a continuous process of separating metals from a metal-bearing material by progressively treating the material in a series of reactor vessels under different pH conditions, the steps of continuously introducing water and material into the top portion of the first vessel in the series, flowing the mixture of water and material along a tortuous path toward the bottom of the first vessel, introducing a gaseous reagent into the bottom of the first vessel and producing a counter-current flow of reagent to the top of the vessel, continuously circulating the mixture and the reagent in the bottom portion of the first vessel, recirculating the reagent treated mixture by pumping it from the bottom to the top of the first vessel, continuously pumping the recirculated mixture from the bottom of the first vessel to the top of the second vessel, and repeating in subsequent vessels the steps performed in the first vessel.

2. The process as claimed in claim 1 wherein the gaseous reagent is introduced into the first vessel by an initially directed flow toward the bottom wall of the vessel, and wherein the mixture of water and material and the reagent is circulated in the bottom portion of the vessel by mechanical agitation which tends to force the mixture against the bottom wall of the vessel and upwardly along its side walls.

3. A continuous process of treating material containing metallic components with sulphur dioxide gas preparatory to subsequent further treatment, comprising the steps of, providing a plurality of deep reaction chambers having agitation means therein supplying a flowable form of material to be treated to one said chamber, applying sulphur dioxide gas into said one chamber below the surface of the material to be treated and causing an agitation of said material as the gas is supplied, monitoring said contents to determine the pH value at all times and altering the rate of sulphur dioxide flow to maintain a controlled pH condition selected to dissolve part of the metallic components in said material, transferring some of the material from the said one chamber to the next chamber and continuously replacing the amount removed with fresh source material, recirculating the material from the bottom to the top of the chamber as well as agitating and circulating the material at the bottom of the chamber, and treating the material transferred with gas in like manner to the treatment in the prior chamber while monitoring to prevent an acidic condition.

References Cited in the file of this patent

UNITED STATES PATENTS

| 1,245,137 | Vadner | Oct. 30, 1917 |
| 1,266,731 | Westby | May 21, 1918 |

FOREIGN PATENTS

| 540,366 | Canada | Apr. 30, 1957 |